Nov. 2, 1926.
J. W. WEBB
1,605,311
PAPER BOARD TESTING MACHINE
Filed Feb. 20, 1922
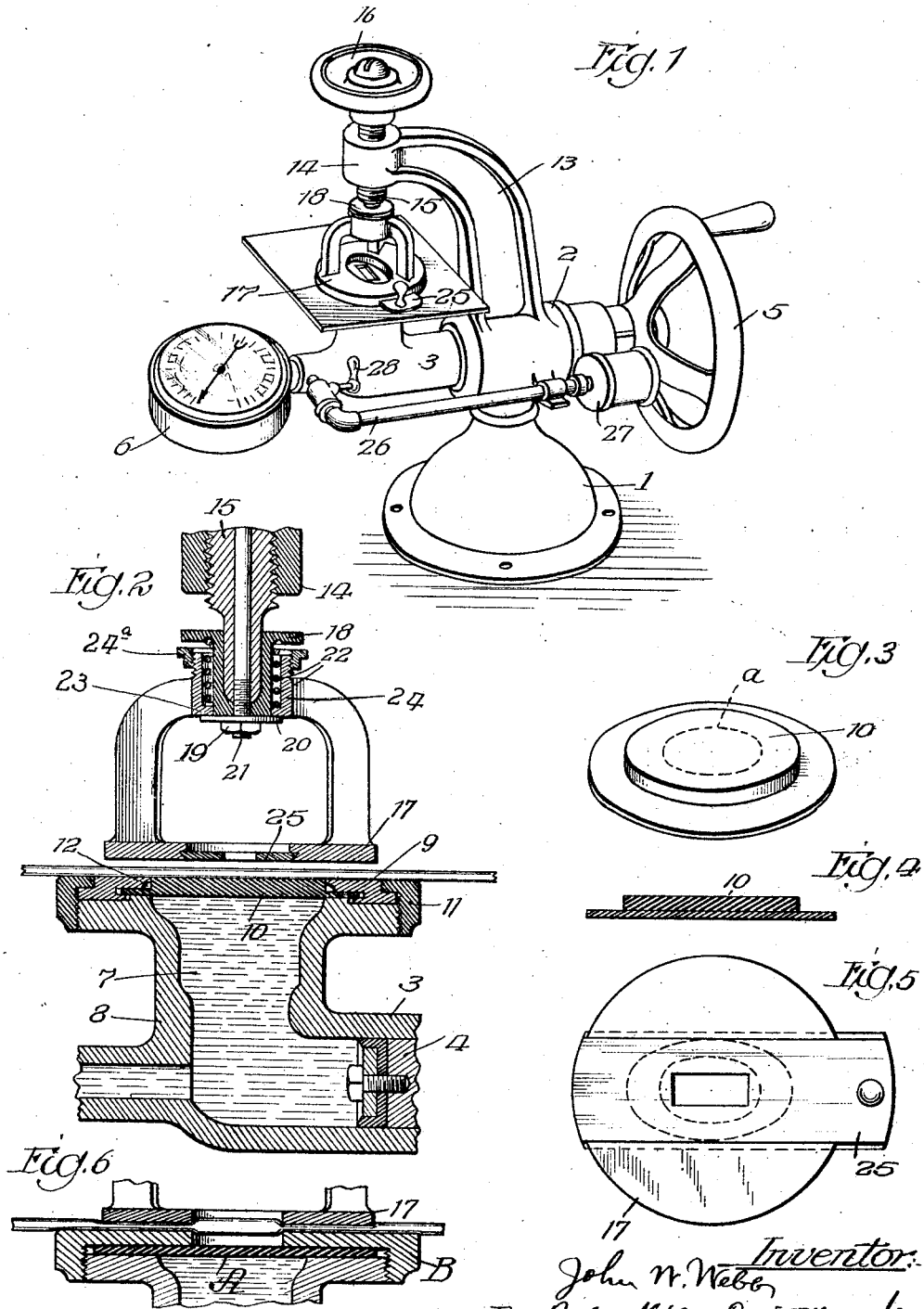

Patented Nov. 2, 1926.

1,605,311

UNITED STATES PATENT OFFICE.

JOHN W. WEBB, OF CHICAGO, ILLINOIS; MINEOLA O'D. WEBB, ADMINISTRATRIX OF SAID JOHN W. WEBB, DECEASED, ASSIGNOR TO WEBB TESTER, INCORPORATED, OF CHICAGO, ILLINOIS, A CORPORATION OF DELAWARE.

PAPER-BOARD-TESTING MACHINE.

Application filed February 20, 1922. Serial No. 537,706.

My invention relates to improvements in a machine which is designed for testing the strength of sheet materials, such as paper, parchment, cardboard and other varieties of fibre board, cellular board made up of sheets of corrugated paper pasted between facing sheets, etc., and which is of the type in which a body of liquid, such as glycerine, is arranged to be put under increasing measured pressure and exert its stress through a rubber diaphragm against a sheet of the material to be tested, backed on its opposite side by an orificed clamping head arranged to hold the material down upon a table having in its upper face an orifice exposing the diaphragm.

In machines of this type as heretofore constructed the registering orifices in the supporting table and clamping head have been of the same size, and the diaphragm has been a relatively thin sheet of very flexible rubber arranged in a plane a substantial distance (about a quarter of an inch) below the plane of the surface of the table, from which several objections have resulted. Because of the pinching effect at the edges of the aligned openings of the table and clamping head, it has been found that when the paper is clamped down with undue force on the table the paper is mutilated and a test under such conditions gives an indication of the bursting strength of the material much below its actual strength. This is particularly true of corrugated paper board.

Another defect is due to the relatively thin diaphragm which must stretch in a spherical curvature a considerable distance before it touches the paper and then begins to exert its stress at the center, gradually extending over a circular area increasing radially, a mode of action which is not conducive to uniformity of action, and almost invariably results in rupturing the lower facing sheet and liner and upper facing sheet successively, the breaks occurring in rapid succession and producing an audible double report or popping sound. The thin flexible diaphragm is further open to the objection that if a relatively small defective spot exists in the paper, especially one at or near the usual lines of rupture, the rupture of the paper will be initiated at such spot before the normal and average bursting strength of the entire area supposed to be under test is reached, and a lower indication of the strength of the paper is given than its true average normal strength.

It is the object of my invention to remedy the defects mentioned, and to perfect and develop the machine to as high a degree of accuracy as possible. One feature of my invention relates to an improved construction and arrangement of the diaphragm and orificed table and clamping head, and another to means for clamping the material upon the table with a pressure which shall be just sufficient for the tests to be made and uniform in all tests. Another feature relates to means for refilling the cylinder to replace any leakage that may occur and maintain the level of the upper surface of the special diaphragm which I have devised in the plane of the paper-supporting table.

With the objects above mentioned in view I have devised and invented the novel paper-testing machine which is hereinafter more particularly described and which contains the improved features of construction mentioned, and my invention resides in the novel construction and arrangement of cooperating parts and members employed in accomplishing the ends in view, the essential elements of my invention being more particularly recited in the appended claims.

In the accompanying drawings, which illustrate my invention in a preferred form of embodiment, Figure 1 is a perspective view illustrating the general form and arrangement of parts of a machine of the Mullin type to which my invention is applied. Fig. 2 is a fragmentary vertical section of the lower portion of the clamping head and adjacent portions of the table and the frame therebelow; Fig. 3 is a perspective of the rubber diaphragm used as the pressure member; Fig. 4 is a central cross-section of the same; Fig. 5 is a bottom plan view of the detachable die used in the clamping head; and Fig. 6 is a fragmentary vertical section of the orificed supporting table and clamping head and the rubber diaphragm of an ordinary paper-testing machine of the type which I have improved, showing the manner in which a piece of corrugated paper is pinched under strong pressure in such manner as to weaken it.

The same reference characters indicate the same parts in all the figures of the drawing.

It will suffice for purposes of explanation of the present invention, to state that a suitable base 1 of the frame of the machine is arranged to support a body portion 2 which has a lateral extension 3 in which is formed a cylinder arranged to receive a piston 4 actuated through a worm by means of hand wheel 5. The member 3 is arranged to support the pressure gauge 6 in the usual manner, the pressure of the liquid in the cylinder chamber being arranged to control the dial mechanism to give an indication of the degree of pressure.

As shown in Fig. 2 the rear end of the cylinder communicates with a passage 7 which is formed in a vertical upwardly extending portion 8 of the member 3 arranged to support the paper supporting table 9. This table is clamped down upon the frame member 8 against the interposed diaphragm 10 by a flanged clamping ring 11 seating in an external shoulder on the table member 9 so that the upper surfaces of the two parts lie in the same plane. The diaphragm is formed of a somewhat harder rubber than the diaphragms heretofore commonly used, and as shown in Figs. 3 and 4 consists of a thin marginal portion and an upwardly projecting central portion which, when the liquid in the cylinder is under no pressure, stands with its upper face flush with the surface of the paper table. As illustrated, the lower edge of the opening in the table 9 is cut away as indicated at 12 so that as the diaphragm expands and stretches under pressure it may be eased at this point.

A curved bracket arm 13 rising from the body 2 is formed at its outer end with an internally threaded vertical hub 14 to receive the screw shaft 15 equipped with a hand wheel 16, through which the clamping head 17 is actuated. The novel device through which a moderate pressure of fixed degree is applied to the head includes a flanged bearing block or cup 18 confined between the lower rounded end of the shaft 15 and a nut 19 and washer 20 carried by the lower end of a retaining rod 21 extending axially therethrough and provided at its upper end with a retaining bolt, and also includes a spring 22, seated on an annular shoulder 23 at the bottom of a central chamber formed in the hub 24 of the spider arms of the clamping head and surrounding the cup 18, the upper end of the spring bearing against the flange of such cup. For a purpose which will later be explained the hub 24 of the spider is exteriorly threaded to receive a screw ring 24ª. It may be noted that the hand wheel illustrated, and which I preferably employ, is of relatively small diameter, intended to be turned by one hand, instead of the usual large wheel, adapted to be gripped with both hands and turned with excessive force.

For the purpose of enabling the machine to be used either with a die having a circular testing orifice of standard area, or with a die having an elongated orifice affording comparative indications of the strength of fibrous paper transversely or longitudinally of the general direction of the fibres, as described in my pending application filed December 19th, 1921, Serial No. 523,308, I have provided the underside of the clamping head with a dovetailed bed formed to receive any selected interchangeable die plate 25, which may be of either of the forms mentioned, or any other form desired. It will be noted, however, that the orifices in the elongated die illustrated fall within the margin of the orifice in the table 9 and the upwardly extending central portion of the diaphragm lying in such last mentioned orifice, and this is also the case with the circular opening of standard size, indicated by the dotted line $a$ in Fig. 3, and the elliptical or oval outline indicated by the dotted line in Fig. 5.

By comparison with Fig. 6, which illustrates the type of diphragm and supporting table heretofore used in the Mullin tester, it will be seen that the diaphragm 10 of the present machine (which as before stated is of somewhat harder rubber than the usual diphragm, marked A in said Figure 6) works with its upper surface resting at zero pressure against the material, and in tending to expand its stretching and expansive action is not interfered with in any manner by a rigid marginal shield, as it is by the inner portion of the clamping and table member B of the ordinary testing machine illustrated in Fig. 6. The portion of my novel diaphragm free to act against the paper is larger than in the prior construction mentioned, and the diaphragm thus operates through the paper directly against the die of the clamping head for some distance outside the line of the orifice.

Since the liquid used in the machine is put under considerable pressure in making tests, it occasionally happens that there is some leakage and because of this, when the piston is retracted to starting position the diphragm may sag below its normal horizontal position, flush with the surface of the table. To provide for replenishment of the liquid in such case I employ an L-shaped refilling pipe 26, the shorter leg of which has a screw-threaded connection with the body member 3 of the machine on which it may be turned as a pivot and the longer leg of which is equipped with a normally closed refilling cup 27 in which a supply of liquid is maintained. A stop cock 28 arranged in the shorter leg may be opened when the tube is in vertical position to allow liquid to flow from the refilling cup to the cylinder, as may be necessary from time to time to replenish leakage.

In making a test with my improved machine the clamping head is screwed down by the hand wheel upon the sheet of material to be tested, the tension of the spring increasing until the flange of the block 18 contacts the ring 24ª carried by the hub of the clamping head. This is instantly perceptible to the touch of the operator, and the clamping is stopped just at the point of contact. By adjustment of the ring 24ª the degree of movement before contact occurs, and consequently the degree of pressure at the point of contact may be varied within the structural limits of the members. At this point, under proper adjustment, the pressure is not sufficient to injure the material, but the clamping head is absolutely firm and unyielding to upward pressure exerted through the diaphragm. Because of the provision of a spring affording means for clamping material with uniform tension perceptible at every testing operation to the operator, and because of the small operating wheel on the clamping screw there is little probability of the clamp being operated to mutilate the board in the manner shown in Fig. 6, a mishap which is especially liable to occur and is especially injurious in the case of corrugated paper board. In the case, however, of dense firm fibre board or similar material which should be firmly clamped the screw pressure upon the clamping head is directly imparted immediately upon contact of the bearing cup 18 with the ring 24ª, and the machine is therefore adapted for use with such material in any position of such ring. The board area subject to liquid pressure under the diaphragm and its relatively thick construction tend to press the material upward and force it with uniform pressure into the orifice in the pressure head die, without searching out any minute imperfection at which to initiate a premature rupture. In the case of corrugated paper board the corrugated liner is evenly compressed over a larger area tending to cause all plies of the paper to burst or rupture at the same time, giving a test of their combined or aggregate strength more uniform and more accurate than has heretofore been attained.

I claim:

1. A machine of the character described having an orificed clamping head and an orificed paper-supporting table and means for creating liquid pressure, a rubber diaphragm exposed at its lower side to the liquid pressure and having a lower marginal portion clamped in the table structure below its surface and a thicker central portion seated within the table orifice and flush with the surface of the table.

2. A machine of the character described having an orificed clamping head and an orificed paper-supporting table and means for creating liquid pressure, a rubber diaphragm exposed at its lower side to the liquid pressure and having a lower marginal portion clamped in the table structure below its surface and a thicker central portion seated within the table orifice and flush with the surface of the table, said thicker central portion of the diaphragm being of greater area than the orifice in the clamping head.

3. A machine of the character described having an orificed clamping head and a supporting frame provided with means for creating liquid pressure, an orificed paper-supporting table member interiorly recessed below and adjacent its top surface, a rubber diaphragm exposed at its lower side to the liquid pressure and having a lower marginal portion disposed within said recess between the top face of said table member and the opposed wall portion of said frame below said recess and having a thicker central portion seated within the orifice of said table member, said marginal and central portions of the diaphragm meeting at right angles to form an annular shoulder and the overhanging portion of said table member being chamfered adjacent the angle at said shoulder.

4. A machine of the character described having an orificed paper-supporting table and means for creating liquid pressure, a rubber diaphragm in said orifice exposed at its lower side to the liquid pressure, and a clamping head arranged to cooperate with said paper-supporting table and adapted to receive interchangeably slides having respectively orifices of different shapes, the orifice in said table exceeding in dimensions the orifices in all the slides.

5. A machine of the charater described having an orificed paper-supporting table and an orificed clamping head, means for imparting clamping pressure to said head comprising a screw shaft mounted in the frame of the machine and equipped with a turning handle for manual actuation, a bearing member engaged by said shaft and having limited movement with respect to said head, and a spring interposed between said bearing member and said head, whereby either initial pressure determined by the spring or positive pressure in excess of such spring pressure may be distinguished by manipulation of the handle and the degree of either pressure varied at will.

6. A machine of the character described having an orificed paper-supporting table and an orificed clamping head, means for imparting clamping pressure to said head comprising a screw shaft mounted in the frame of the machine, a bearing member engaged by said shaft and having limited movement with respect to said head, said clamping head being formed with a central spring chamber, a flanged cup engaged by said shaft and arranged within said chamber, a spring in said chamber bearing against said flange, the flange of said cup being arranged to contact said clamping head at predetermined pressure, and a swivel connection between said clamping head and said screw shaft extending through said cup and the wall of the chamber in such head.

7. A machine of the character described having an orificed paper-supporting table and an orificed clamping head, means for imparting clamping pressure to said head comprising a screw shaft mounted in the frame of the machine, a bearing member engaged by said shaft and having limited movement with respect to said head, adjusting means for varying the degree of movement between said head and said bearing member, and a spring interposed between said head and said bearing member, whereby either predetermined spring pressure or positive pressure in excess of such determined pressure may be imparted at will.

8. A machine of the character described having an orificed paper-supporting table and an orificed clamping head, said head being provided with a central hub formed with a spring chamber, means for imparting predetermined pressure to said head comprising a screw shaft mounted in the frame of the machine, a flanged cup engaged by said shaft and arranged within said chamber, a spring in said chamber, and an adjusting ring making screw-threaded engagement with said hub and arranged to cooperate with the flange of said cup.

9. A machine of the character described having means for creating liquid pressure, an orificed clamping head, an orificed paper supporting table, and a rubber diaphragm exposed at its lower side to the liquid pressure in the orifice in said table, the area of the orifice in said table exceeding the area of the orifice in said clamping head and said rubber diaphragm being thicker opposite the orifice in the clamping head than in the surrounding portion.

JOHN W. WEBP.